United States Patent
Amm et al.

(10) Patent No.: US 10,735,106 B2
(45) Date of Patent: Aug. 4, 2020

(54) MOBILE DEVICE WITH ULTRASOUND RANGING

(71) Applicant: Apple Inc., Cupertino, CA (US)

(72) Inventors: David Amm, Morgan Hill, CA (US); Brian Michael King, Saratoga, CA (US); Steven P. Hotelling, Los Gatos, CA (US); Michael B. Wittenberg, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 1040 days.

(21) Appl. No.: 13/794,492

(22) Filed: Mar. 11, 2013

(65) Prior Publication Data
US 2014/0160893 A1 Jun. 12, 2014

Related U.S. Application Data

(60) Provisional application No. 61/735,525, filed on Dec. 10, 2012.

(51) Int. Cl.
*H04B 11/00* (2006.01)
*H04M 1/737* (2006.01)
(Continued)

(52) U.S. Cl.
CPC .......... *H04B 11/00* (2013.01); *H04M 1/2155* (2013.01); *H04M 1/7253* (2013.01); *H04M 1/737* (2013.01)

(58) Field of Classification Search
USPC .................................................. 367/118, 127
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2012/123787 A1 | 9/2012 |

OTHER PUBLICATIONS

Hazas, M. et al. (2005). "A Relative Positioning System for Co-located Mobile Devices," *MobiSys '05: Proceedings of the $3^{hu\ rd}$ International Conference on Mobile Systems, Applications, and Services*, New York, NY, ACM Press, pp. 177-190.

(Continued)

*Primary Examiner* — James R Hulka
(74) *Attorney, Agent, or Firm* — Morgan, Lewis & Bockius LLP

(57) ABSTRACT

Mobile devices with ultrasound ranging are disclosed. A mobile device with ultrasound ranging can include a multifunctional component capable of performing multiple functions in the device, where the component can function as an ultrasound transmitter capable of transmitting an ultrasound signal to a proximate device. In some examples, the component can also function as a power button capable of powering the device up and down. In some examples, the component can also function as a home button capable of causing a home page to display on the device. The mobile device can further include an ultrasound receiver capable of receiving an ultrasound signal from the proximate device, where the device can calculate a range of the proximate device based on a time lapse associated with the received ultrasound signal.

20 Claims, 9 Drawing Sheets

(51) Int. Cl.
*H04M 1/725* (2006.01)
*H04M 1/215* (2006.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,842,401 B2* | 1/2005 | Chiang et al. | 367/138 |
| 7,015,894 B2 | 3/2006 | Morohoshi | |
| 7,184,064 B2 | 2/2007 | Zimmerman et al. | |
| 7,292,187 B2* | 11/2007 | Recker | 342/458 |
| 7,414,705 B2* | 8/2008 | Boillot | 356/5.01 |
| 7,663,607 B2 | 2/2010 | Hotelling et al. | |
| 8,479,122 B2* | 7/2013 | Hotelling et al. | 715/863 |
| 8,654,610 B2* | 2/2014 | Megdal | G01S 5/0045 367/117 |
| 2002/0002990 A1* | 1/2002 | Wohlgemuth | 134/105 |
| 2003/0071858 A1* | 4/2003 | Morohoshi | 345/856 |
| 2004/0192353 A1* | 9/2004 | Mason et al. | 455/457 |
| 2005/0023118 A1* | 2/2005 | Dunfield | G04G 15/003 200/200 |
| 2005/0062639 A1* | 3/2005 | Biggs | 342/22 |
| 2005/0285787 A1* | 12/2005 | Delaveau et al. | 342/387 |
| 2006/0026521 A1 | 2/2006 | Hotelling et al. | |
| 2006/0097991 A1* | 5/2006 | Hotelling et al. | 345/173 |
| 2006/0125693 A1* | 6/2006 | Recker | 342/458 |
| 2006/0197753 A1 | 9/2006 | Hotelling | |
| 2007/0042816 A1* | 2/2007 | Chan | H04M 1/66 455/575.1 |
| 2007/0121097 A1* | 5/2007 | Boillot | 356/28 |
| 2007/0189548 A1* | 8/2007 | Croft, III | 381/77 |
| 2008/0037130 A1* | 2/2008 | Turnbull | B60R 1/088 359/604 |
| 2008/0038128 A1* | 2/2008 | Haar | 417/474 |
| 2008/0088602 A1* | 4/2008 | Hotelling | 345/173 |
| 2008/0102764 A1* | 5/2008 | Thornton et al. | 455/84 |
| 2009/0024273 A1* | 1/2009 | Follmer | G06Q 10/10 701/33.4 |
| 2010/0002777 A1* | 1/2010 | Boyle et al. | 375/242 |
| 2010/0256814 A1* | 10/2010 | Smith | 700/259 |
| 2011/0003614 A1* | 1/2011 | Langereis et al. | 455/550.1 |
| 2011/0007650 A1* | 1/2011 | Nam et al. | 370/252 |
| 2011/0086600 A1* | 4/2011 | Muhammad | 455/120 |
| 2011/0119024 A1* | 5/2011 | Nam et al. | 702/150 |
| 2011/0129101 A1* | 6/2011 | Hooley | H04R 3/005 381/92 |
| 2011/0141853 A1* | 6/2011 | Megdal | G01S 5/0045 367/117 |
| 2011/0157366 A1* | 6/2011 | Padmanabh | H04N 7/15 348/159 |
| 2012/0001875 A1* | 1/2012 | Li et al. | 345/177 |
| 2013/0002550 A1 | 1/2013 | Zalewski | |
| 2013/0030257 A1* | 1/2013 | Nakata | A61B 5/4836 600/301 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MOBILE DEVICE WITH ULTRASOUND RANGING

CROSS REFERENCE TO RELATED APPLICATIONS

This application claims priority to U.S. Provisional Patent Application No. 61/735,525, filed Dec. 10, 2012, the entire contents of which are incorporated herein by reference.

FIELD

This relates generally to ultrasound ranging and more specifically to ultrasound ranging mobile devices.

BACKGROUND

Mobile devices are very popular because of their portability, convenience, and versatile functionality. Such devices can include touch functionality that allows a user to perform various functions by touching a touch sensor panel using a finger, stylus, or other object at a location often dictated by a user interface (UI) being displayed by a display device; display functionality that allows a user to view on the display device a variety of information, either passively, such as reading text on the UI, or interactively, such as playing games or chatting in real time to another user; and communication functionality that allows a user to share video, audio, textual, and graphical data with others, through phone call, email, text messaging, chat rooms, music, streaming video, and the like.

Current networks allow mobile devices to connect to other devices in order to share information. In some cases, the devices can be far away from each other. In other cases, the devices can be in close proximity, within transmission capabilities of the individual device.

Taking advantage of device capabilities to easily and quickly facilitate communication therebetween when the devices are in close proximity is desirable.

SUMMARY

This relates to ultrasonic ranging mobile devices, which can find proximate devices using ultrasound so as to communicate and share data between devices. A mobile device with ultrasound ranging can include a multifunctional component capable of performing multiple functions in the device, where the component can function as an ultrasound transmitter capable of transmitting an ultrasound signal to a proximate device. In some examples, the component can also function as a power button capable of powering the device up and down. In some examples, the component can also function as a home button capable of causing a home page to display on the device. The mobile device can further include an ultrasound receiver capable of receiving an ultrasound signal from the proximate device, where the device can calculate a range to the proximate device based on a time lapse associated with the received ultrasound signal. Ultrasonic ranging by mobile devices can advantageously increase the versatility of the devices to communicate with each other in a variety of environments and applications.

This summary is provided to introduce concepts in simplified form that are further described below in the Detailed Description. This summary is not intended to identify key features or essential features of the disclosed subject matter and is not intended to describe each disclosed embodiment or every implementation of the disclosed subject matter.

DETAILED DESCRIPTION

In the following description, reference is made to the accompanying drawings in which it is shown by way of illustration specific examples of the disclosure that can be practiced. It is to be understood that other examples can be used and structural changes can be made without departing from the scope of the various examples of the disclosure.

This relates to ultrasonic ranging mobile devices, which can find proximate devices using ultrasound so as to communicate and share data between devices. A mobile device with ultrasound ranging can include a multifunctional component capable of performing multiple functions in the device, where the component can function as an ultrasound transmitter capable of transmitting an ultrasound signal to a proximate device. In some examples, the component can be disposed on an exterior surface of the device. As such, the component can be open to air so as to easily transmit ultrasound signals without an aperture, like internal components, through which to pass the ultrasound signals. In some examples, the component can also function as a power button capable of powering the device up and down. In some examples, the component can also function as a home button capable of causing a home page to display on the device. The mobile device can further include an ultrasound receiver capable of receiving an ultrasound signal from the proximate device, where the device can calculate a range between the mobile device and the proximate device based on a time lapse associated with the received ultrasound signal. In some examples, the receiver can be disposed on the device's exterior and open to air so as to easily receive ultrasound signals without an aperture through which to pass the ultrasound signals. In some examples, the component can function as an ultrasound transceiver capable of both transmitting and receiving ultrasound signals.

This further relates to the mobile device housing and ultrasound components housed therein. The housing can include at least one aperture capable of passing sound waves therethrough and at least one ultrasound receiver disposed within the housing and proximate to the aperture to receive ultrasound signals through the aperture. In some examples, multiple ultrasound receivers can have individual apertures. In some examples, multiple ultrasound receivers can share an aperture. The housing can further include an audio receiver capable of detecting audio signals. In some examples, the audio and ultrasound receivers can have individual apertures. In some examples, the audio and ultrasound receivers can share an aperture. In some examples, multiple ultrasound transmitters and receivers can be disposed on different sides of the device so as to effectively transmit signals when the device changes orientation.

Ultrasonic ranging by mobile devices can advantageously increase the versatility of the devices to communicate with each other in a variety of environments and applications.

Figure 1:
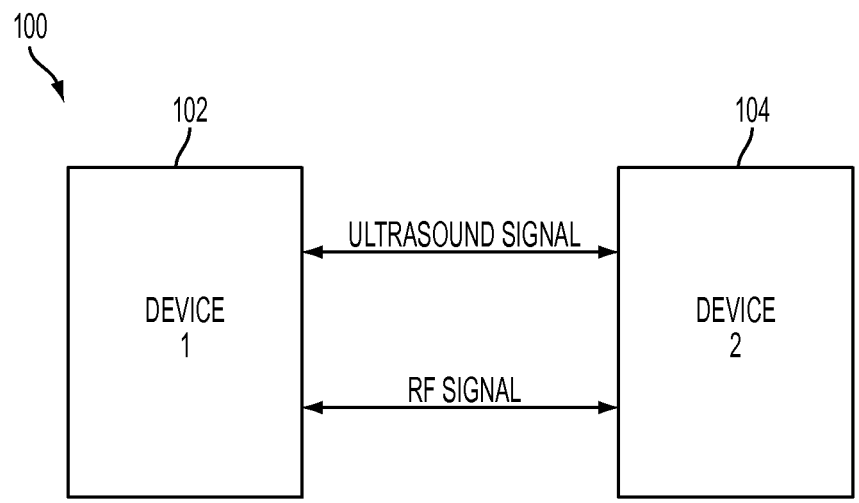
FIG. 1 illustrates ultrasound ranging between mobile devices according to various examples of the disclosure.

FIG. 1 illustrates ultrasound ranging between two mobile devices. In the example of FIG. 1, system 100 can include device 102 and device 104 in close proximity. Device 102 can transmit ultrasound signals to device 104 to determine the distance or range to device 104. Similarly, device 104 can transmit ultrasound signals to device 102. Either device 102, 104 can initiate the transmission of the ultrasound signals, while the other device can respond with transmission of its ultrasound signals. The initiating device can use the two sets of ultrasound signals, e.g., the signals it sent and the signals it received from the other device, to determine the range between the devices. In some examples, both devices 102, 104 can be mobile. In some examples, either device 102, 104 can be mobile, while the other is fixed at a location. In some examples, both devices 102, 104 can be at fixed locations.

In addition to ultrasound signals, device 102 can also transmit radio frequency (RF) signals to device 104 to assist with ranging, to communicate its presence and other information to device 104, and/or to synchronize the two devices' clocks. Similarly, device 104 can transmit RF signals to device 102.

Device 102 can further transmit data, e.g., transaction data, channel and frequency data, device identification data, and so on, to device 104 in the ultrasound, RF, or other electromagnetic signals, such as optical signals. Similarly, device 104 can transmit data to device 102.

Although the example of FIG. 1 shows only two devices, it should be understood that any number of devices, e.g., 3, 4, or more, in close proximity can establish a de facto communication network, using ultrasound signals to determine range of devices, RF signals to synchronize devices, and either or both signals to transfer relevant data, depending on the capabilities of the devices. With a larger number of devices, ultrasound signals can be used for trilateration of all the devices, which can result in a three-dimensional map of the devices. In some examples, with the larger number of devices, one device can be a centralized device to gather information from and share information with the other devices, and estimate the three-dimensional map and orientations of the devices.

It should further be understood that other electromagnetic signals, e.g., infrared (IR), visible light, and the like, can also be used with ultrasound for ranging of proximate devices according to various examples.

Figure 2:
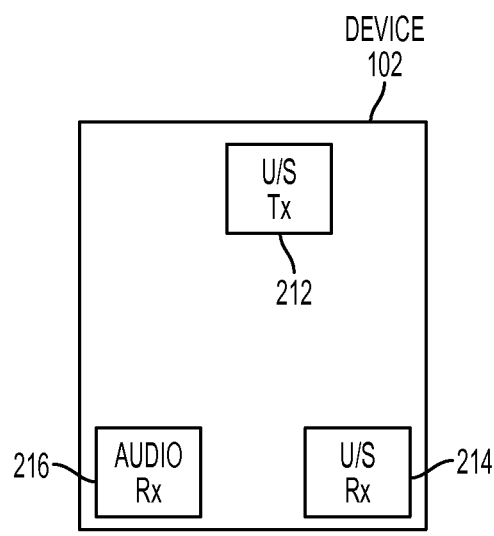
FIG. 2 illustrates a mobile device capable of ultrasound ranging according to various examples of the disclosure.

FIG. 2 illustrates a mobile device capable of ultrasound ranging. In the example of FIG. 2, device 102 can include ultrasound transmitter 212 to transmit ultrasound signals to proximate devices. In some examples, the ultrasound transmitter 212 can be a transducer or any other suitable device for generating and transmitting ultrasound signals. Device 102 can also include ultrasound receiver 214 to receive ultrasound signals from proximate devices. In some examples, the ultrasound receiver 214 can be a microphone or any other suitable device for detecting ultrasound signals.

Although the example of FIG. 2 shows the transmitter and receiver as separate components, it should be understood that the two can be combined as a transceiver to both transmit and receive ultrasound signals. It should further be understood that more than one transmitter and/or receiver can be used to provide stereo capabilities for the device. For example, multiple ultrasound receivers can receive an ultrasound signal at slightly different times, such that the time differences can be used to determine the relative orientation (or angle) to the proximate device.

In addition to ultrasound components, device 102 can include an audio receiver 216 for detecting audio signals, e.g., voice, music, and other audible signals that can be inputted to the device.

Figure 3:
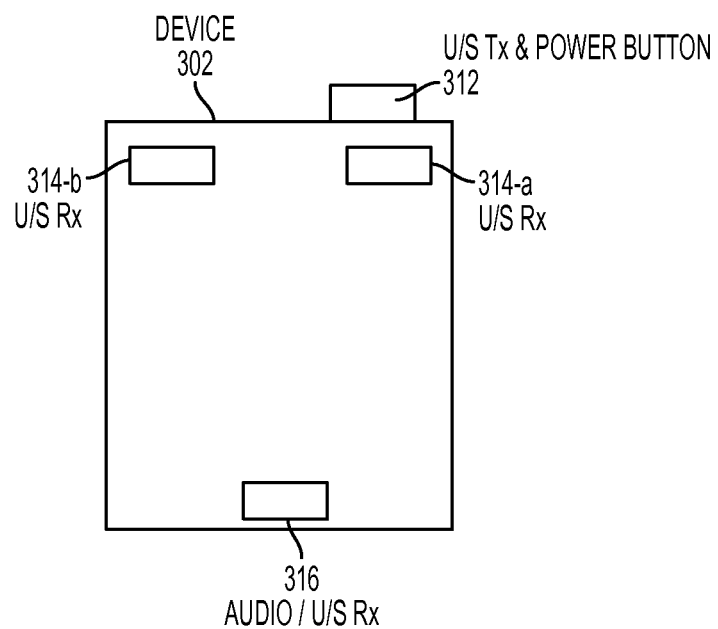
FIG. 3 illustrates a mobile device having a combined ultrasound transmitter and power button for ultrasound ranging according to various examples of the disclosure.

FIG. 3 illustrates a mobile device capable of ultrasound ranging, having a combined ultrasound transmitter and power button. In the example of FIG. 3, device 302 can include combined ultrasound transmitter and power button 312 for transmitting ultrasound signals and powering up or down the device. In some examples, a user can actuate the ultrasound transmitter manually by pressing the button 312 to cause a vibration in the transmitter. In some examples, the transmitter can be actuated by the device. In some examples, the transmitter can be a transducer or any other suitable component for generating and transmitting ultrasound signals. In some examples, the transmitter can be unidirectional or directed. In some examples, the transmitter can be omnidirectional. In some examples, the button can act as a transceiver, able to both transmit and detect ultrasound signals. An advantage of the button being a transmitter, receiver, or transceiver is that it is on the exterior of the device and need not have an aperture, as would an internal component, through which to transmit and receive signals.

Device 302 can further include ultrasound receivers 314 for detecting ultrasound transmissions from proximate devices. In some examples, multiple receivers can be used to create a stereo effect, thereby providing an orientation (or angle) of the proximate device. In some examples, the receivers can be disposed on the back side of the device in a natural position facing proximate devices. In some examples, the receivers can be unidirectional or directed. In some examples, the receivers can be omnidirectional. In some examples, the receivers can include a combination of unidirectional or directed receivers and omnidirectional receivers.

Device 302 can further include combined audio and ultrasound receiver 316 for detecting ultrasound transmissions from proximate devices and also audio transmissions from external sources. In some examples, the combined receiver 316 can be tunable to the different frequencies of ultrasound and audio signals. In some examples, the combined receiver 316 can have various frequency sensitive components. In some embodiments, the receiver 316 can be solely an audio receiver for detecting audio transmissions. Similar to above, in some examples, the combined receiver can be unidirectional, directed, or omnidirectional.

Figure 4:
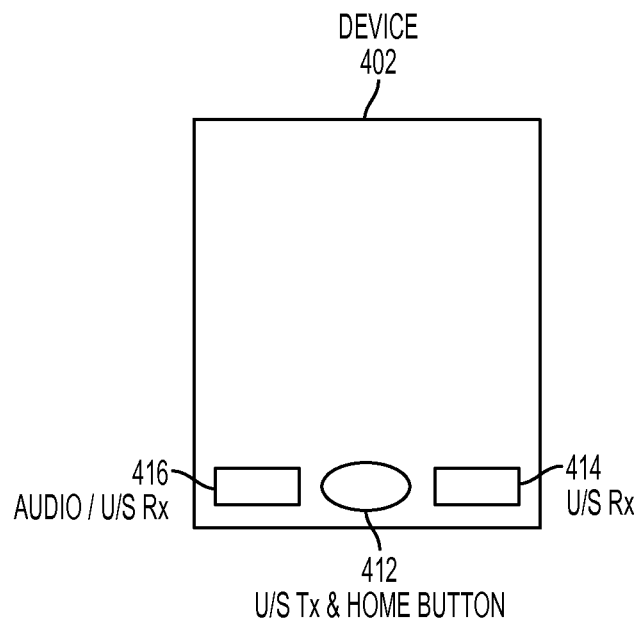
FIG. 4 illustrates a mobile device having a combined ultrasound transmitter and home button for ultrasound ranging according to various examples of the disclosure.

FIG. 4 illustrates a mobile device capable of ultrasound ranging, having a combined ultrasound transmitter and home button. In the example of FIG. 4, device 402 can include combined ultrasound transmitter and home button 412 for transmitting ultrasound signals and for returning the UI to a home display. In some examples, a user can actuate the ultrasound transmitter manually by pressing the button 412. In some examples, the transmitter can be actuated by the device.

Device 402 can also include ultrasound receiver 414 to detect ultrasound transmissions from proximate devices and combined audio and ultrasound receiver 416 to detect both audio and ultrasound transmissions, as described previously regarding FIG. 3.

Figure 5:
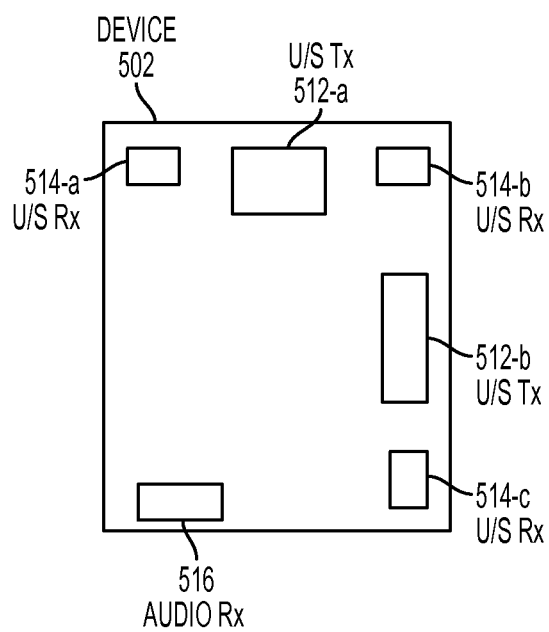
FIG. 5 illustrates a mobile device having multiple ultrasound transmitters and receivers for ultrasound ranging according to various examples of the disclosure.

Mobile devices can be operated in a variety of orientations. Accordingly, the ability to perform ultrasound ranging in the varied orientations can be desirable. FIG. 5 illustrates a mobile device capable of ultrasound ranging, having multiple transmitters and receivers disposed about the device. In the example of FIG. 5, one ultrasound transmitter 512-a can be disposed along a "portrait" end of the device so as to effectively transmit ultrasound signals toward proximate devices when the device is held in this "portrait" or upright position. Ultrasound receivers 514-a, 514-b can be proximate to the transmitter 512-a for detecting ultrasound transmissions from the proximate devices.

Another ultrasound transmitter 512-b can be disposed along a "landscape" end of the device so as to effectively transmit ultrasound signals toward proximate devices when the device is held in this "landscape" or sideways position. Ultrasound receivers 514-b, 514-c can be proximate to the transmitter 512-b for detecting ultrasound transmissions from the proximate devices.

Device 502 can further include audio receiver 516 for detecting audio signals from external sources.

It should be understood that examples of mobile devices for ultrasound ranging are not limited to those illustrated in FIGS. 3 through 5, but can include other configurations and/or additional components capable of performing ranging.

Figure 6:
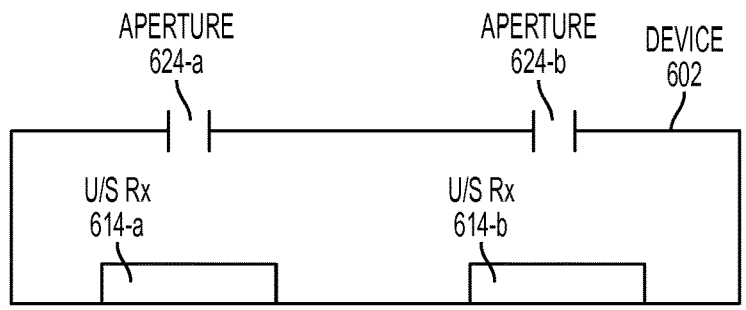
FIG. 6 illustrates a cross-sectional view of a mobile device having multiple apertures and ultrasound receivers according to various examples of the disclosure.

FIGS. 6 through 9 illustrate various cross-sectional views of audio and ultrasound receivers in a mobile device for ranging. FIG. 6 illustrates a device housing multiple ultrasound receivers and apertures. In the example of FIG. 6, device 602 can include two ultrasound receivers 614 for detecting ultrasound signals. Aperture 624-a can be proximate to the receiver 614-a to allow sound waves through to the receiver. Aperture 624-b can be proximate to the receiver 614-b to allow sound waves through to that receiver.

Figure 7:
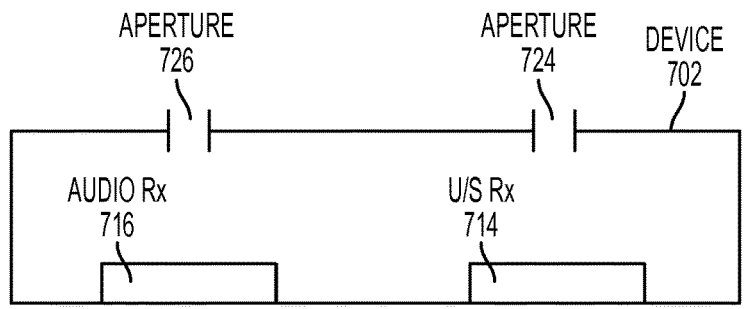
FIG. 7 illustrates a cross-sectional view of a mobile device having multiple apertures and audio and ultrasound receivers according to various examples of the disclosure.

FIG. 7 illustrates a device housing audio and ultrasound receivers with separate apertures. In the example of FIG. 7, device 702 can include audio receiver 716 for detecting audio signals. Aperture 726 can be proximate to the audio receiver 716 to allow sound waves through to the receiver. Device 702 can also include ultrasound receiver 714 for detecting ultrasound signals. Aperture 724 can be proximate to the ultrasound receiver 714 to allow sound waves through to the receiver.

Figure 8:
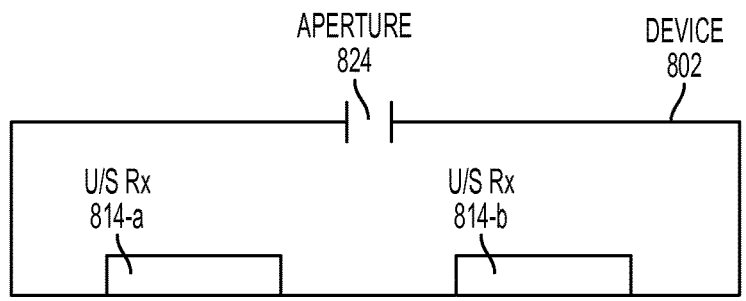
FIG. 8 illustrates a cross-sectional view of a mobile device having one aperture and multiple ultrasound receivers according to various examples of the disclosure.

FIG. 8 illustrates a device housing a shared aperture for multiple ultrasound receivers. In the example of FIG. 8, device 802 can include shared aperture 824 proximate to ultrasound receivers 814-a, 814-b to allow sound waves through to the receivers.

Figure 9:
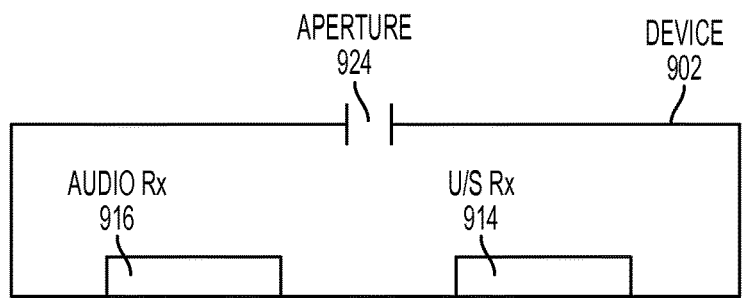
FIG. 9 illustrates a cross-sectional view of a mobile device having one aperture and audio and ultrasound receivers according to various examples of the disclosure.

FIG. 9 illustrates a device having a shared aperture for the audio and ultrasound receivers. In the example of FIG. 9, device 902 can include audio receiver 916 and ultrasound receiver 914 with aperture 924 proximate to the receivers to allow sound waves through to the receivers. Ideally, the audio receiver 916 can detect the audio sound waves through the aperture 924 and the ultrasound receiver 914 can detect the ultrasound waves through the aperture.

It should be understood that other configurations of the audio and ultrasound receivers are also possible.

Figure 10:
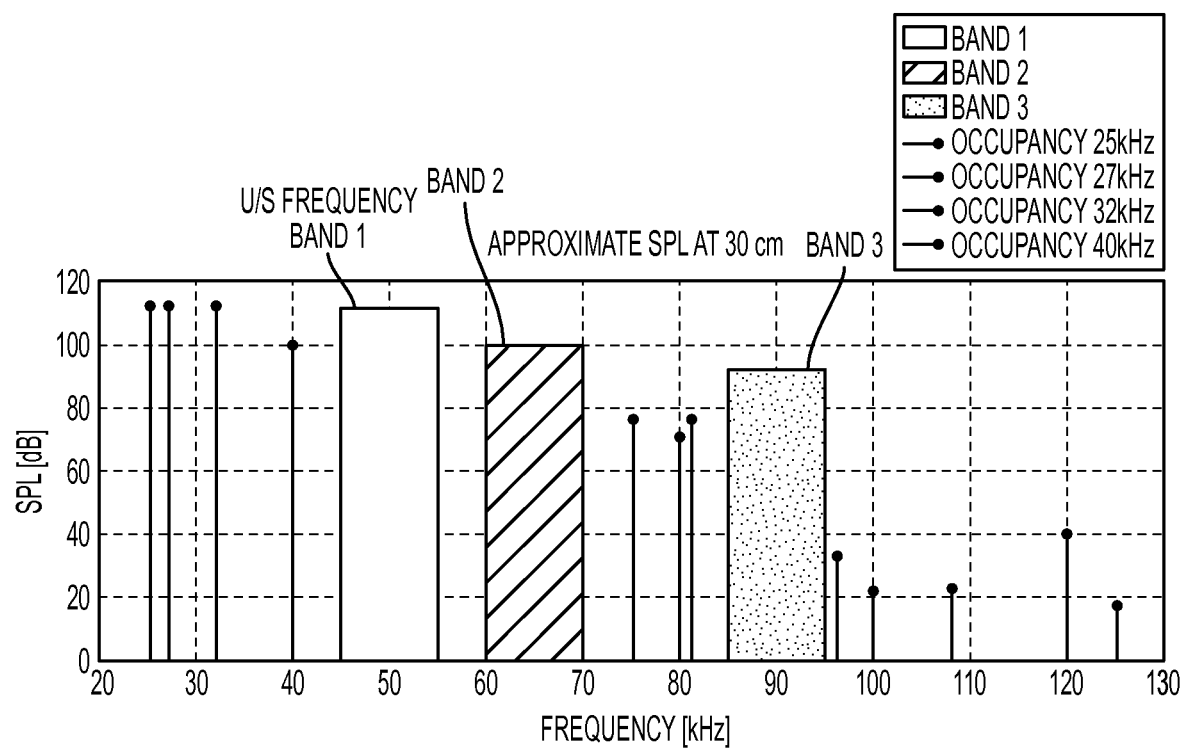
FIG. 10 depicts ultrasound frequency bands that can be used for ranging according to various examples of the disclosure.

Preferably, the frequencies of the ultrasound signals used in range finding fall within a band that can provide adequate performance in the presence of any narrow or wideband interference sources, both indoor and outdoor sources, and in various environmental conditions, e.g., temperature and humidity; and that can produce higher sound pressure levels (SPL). FIG. 10 depicts ultrasound frequency bands that satisfy these preferences. In the example of FIG. 10, three frequency bands of operation with minimum SPL at 30 cm are shown—band 1 at 45-55 kHz, 110 dB SPL; band 2 at 60-70 kHz, 100 dB SPL; and band 3 at 85-95 kHz, 90 dB SPL. Each band is 10 kHz wide and provides at least 5 frequency channels, e.g., spaced 2.5 kHz apart. These frequency bands can be preferable because of (a) generally low presence (or occupancy) of other narrow or wideband interference sources (highest occupancy being at other frequencies, e.g., 25, 27, 32, and 40 kHz), (b) low attenuation of signals at typical indoor humidity levels, e.g., humidity between 30-50%, and (c) high SPL.

Other configurations of the frequencies for ultrasound signals used in ranging are also possible. In some examples, a wideband signal can be used. In some examples, two wider frequency bands can be used. In some examples, more than three narrower frequency bands can be used. In some examples, more than 5 frequency channels can be used within each band. In some examples, less than 5 frequency channels can be used within each band. In some examples, the channels in each band can be contiguous. In some examples, the channels in each band can be separate. In some examples, the frequency bands can be spaced closer together. In some examples, the frequency bands can be spaced farther apart. In some examples, an ultrasound signal can include multiple narrowband frequency components that span a large frequency range.

Various types of transmissions can be used to transmit ultrasound signals for ranging. For example, a tone burst signal can be used to transmit the ultrasound signals, in which a constant tone amplitude of some duration is transmitted. It should be noted that the pulse shape of the signal is the signal that would multiply a carrier at the desired transmit frequency to produce the waveform that propagates acoustically over the air. Because the tone burst signal, in some examples, is commonly used in ultrasound occupancy sensors, other ultrasound transmissions can be mistaken for the device's ultrasound signal. Accordingly, pulse shaping can be applied to the signal to provide a smoother transition between low and high voltages and to control the bandwidth of the signal and the interference it would create to signals in nearby frequencies. In another example, a chirping signal can be used to transmit the ultrasound signals, in which a sine-like wave of some duration is transmitted, where the signal can start at a lower frequency and then ramp up to higher frequencies over the duration of the signal. Because of the frequency changes, the chirping signal can be less sensitive to interference at any particular frequency. The chirping signal can also provide higher precision ranging. In another example, a CDMA signal can be used to transmit the ultrasound signals to allow multiple devices to transmit over the same channel or within the same frequency band. It should be understood that other transmission types can be used that are capable of transmitting ultrasound signals for ranging devices.

Figure 11:
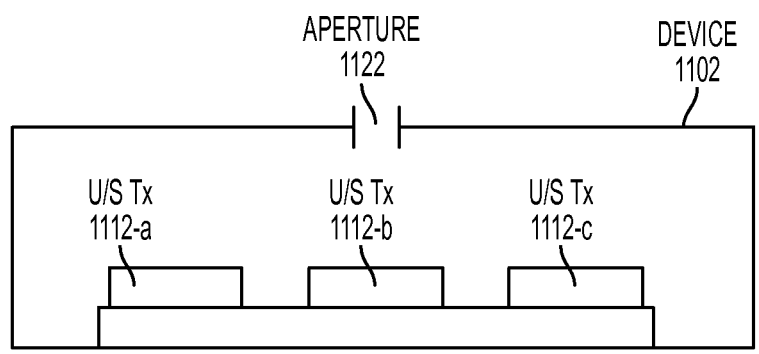
FIG. 11 illustrates a cross-sectional view of a mobile device having multiple die in an ultrasound transmitter according to various examples of the disclosure.

FIG. 11 illustrates a cross-sectional view of an ultrasound transmitter in a mobile device for ranging. In the example of FIG. 11, device 1102 can include three separate die within one ultrasound transmitter 1112, where each die has a transmitter sensitive to different frequencies. For example, referring back to FIG. 10 in which there are three frequency bands, in FIG. 11, die 1112-$a$ can include an ultrasound transmitter capable of generating ultrasound signals within frequency band 1, e.g., 45-55 kHz; die 1112-$b$ can include an ultrasound transmitter capable of generating ultrasound signals within band 2, e.g., 60-70 kHz; and die 1112-$c$ can include an ultrasound transmitter capable of generating ultrasound signals within band 3, e.g., 85-95 kHz. Housing multiple die within one ultrasound transmitter package advantageously provides a more robust transmitter within a space constrained device. Aperture 1122 can be the opening through which ultrasound signals pass from the transmitter 1112.

In some examples, the three die can have the same design, the difference being in their frequency sensitivities. In some examples, there can be different designs as well as frequency sensitivities for multi-die transmitters.

Figure 12:
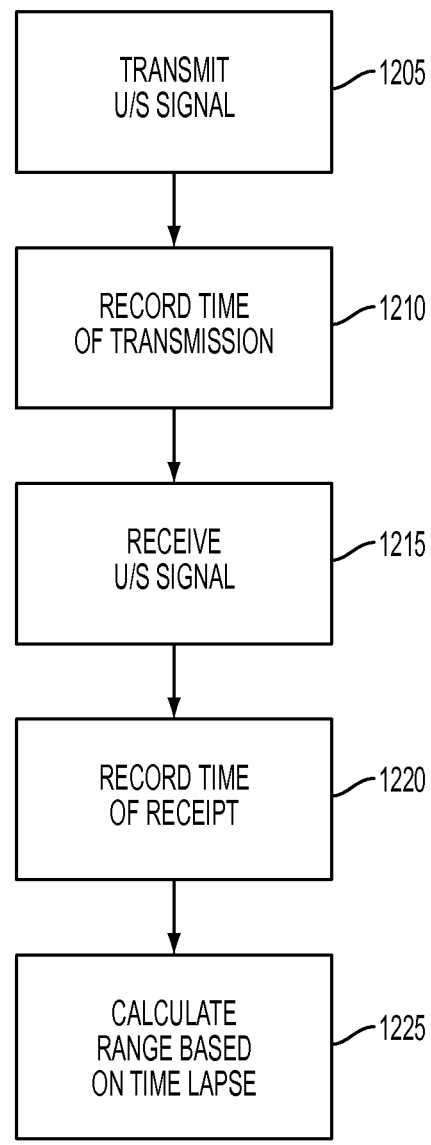
FIG. 12 illustrates a method for finding a range of a mobile device using ultrasound according to various examples of the disclosure.

FIG. 12 illustrates a time-of-flight method for finding a range of a device, e.g., the devices of FIG. 1, using ultrasound. In the example of FIG. 12, a first device can transmit an ultrasound signal (1205). The device can record the time at which the transmission occurs (1210). A proximate device can receive the transmitted signal and respond by transmitting its own ultrasound signal. The first device can receive the ultrasound signal transmitted from the proximate device (1215). The first device can also record the time at which it received the signal from the proximate device (1220). The first device can calculate the time lapse between the recorded time of transmission of its ultrasound signal and the recorded time of receipt of the ultrasound signal from the proximate device. Based on the time lapse and the known speed of sound (ultrasound), the first device can then calculate the range to the proximate device (1225).

Alternatively, the proximate device can become the initiating device and the first device the responding device. The proximate device can then use the same method to calculate the range to the first device.

In some examples, time corrections can be made in the range calculation to account for any signal delays, e.g., the time for the proximate device to process the first device's signal and then transmit its own ultrasound signal in response, the time that the first device calculates the device range, and so on. In some examples, a predetermined delay can be subtracted from the calculated time lapse. In some examples, the processing of the ultrasound signals and the calculation of the device range can be done by dedicated hardware or a sub-system for a faster response. In some examples, the processing of the ultrasound signals and the calculation of the device range can be done by software operating on the device processor or other local or remote processing elements.

An example range calculation can be as follows, $$d = \frac{c}{2}(t_2 - t_{off})$$

where d=range or distance of device, c=speed of sound, $t_f$=time lapse between time of transmission of ultrasound signal and time of receipt of return ultrasound signal, and $t_{off}$=offset time accounting for system delays. This calculation can be used when the first device's transmitter emits a signal and awaiting a return signal from the proximate device, in a "round trip" implementation.

Another example range calculation can be as follows, $$d = c(t_f - t_{off})$$

where $t_f$=time lapse between time of transmission of an ultrasound signal from a first device and time of receipt of that signal at a proximate device. This calculation can be used when the first device's transmitter emits a signal and the proximate device receives that signal, in a "one-way trip" implementation.

Range calculations can sometimes be affected by device orientation. Many devices have inertial sensors to determine device orientation. Accordingly, in conjunction with time lapse data, a device can use its orientation data, a proximate device's orientation data, or both to calculate the range to the proximate device.

Other methods for determining a range of a mobile device relative to other devices are also possible.

It should be understood that ultrasound may be used for other applications, in addition to ranging, such as determining presence of a device in a particular space. That is, a device can detect an ultrasound signal, indicating the presence of the device in the same space of the device which transmitted that ultrasound signal.

Figure 13:
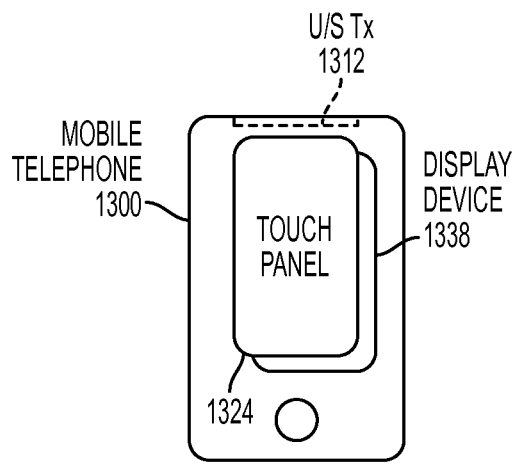
FIG. 13 illustrates a mobile telephone that can include ultrasound ranging according to various examples of the disclosure.

FIG. 13 illustrates an exemplary mobile telephone 1300 that can include touch panel 1324, display 1338, ultrasound transmitter 1312, and other computing system blocks according to various examples.

Figure 14:
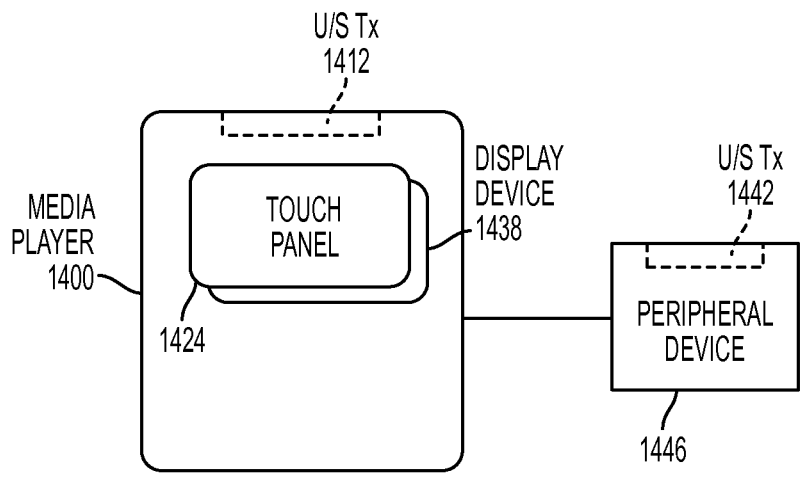
FIG. 14 illustrates a digital media player that can include ultrasound ranging and be optionally coupled to a peripheral device with ultrasound ranging according to various examples of the disclosure.

FIG. 14 illustrates an exemplary digital media player 1400 that can include touch panel 1424, display 1438, ultrasound transmitter 1412, and other computing system blocks according to various examples. The player 1400 can play audio, video, or both and can be optionally coupled to peripheral device 1446 which can include ultrasound transmitter 1442 and be capable of transmitting content, e.g., music, TV, movies, games, and the like, to the player or any other suitable proximate device.

Figure 15:
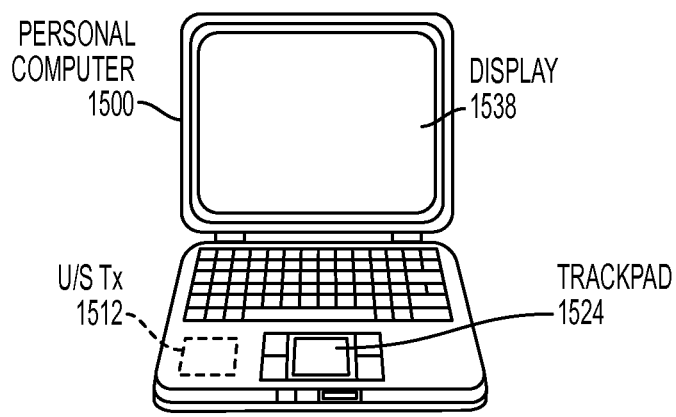
FIG. 15 illustrates a portable computer that can include ultrasound ranging according to various examples of the disclosure.

FIG. 15 illustrates an exemplary personal computer 1500 that can include touch panel (trackpad) 1524, display 1538, ultrasound transmitter 1512, and other computing system blocks according to various examples.

The mobile telephone, media player, and personal computer of FIGS. 13 through 15 can increase capabilities and improve performance with ultrasound ranging according to various examples.

Figure 16:
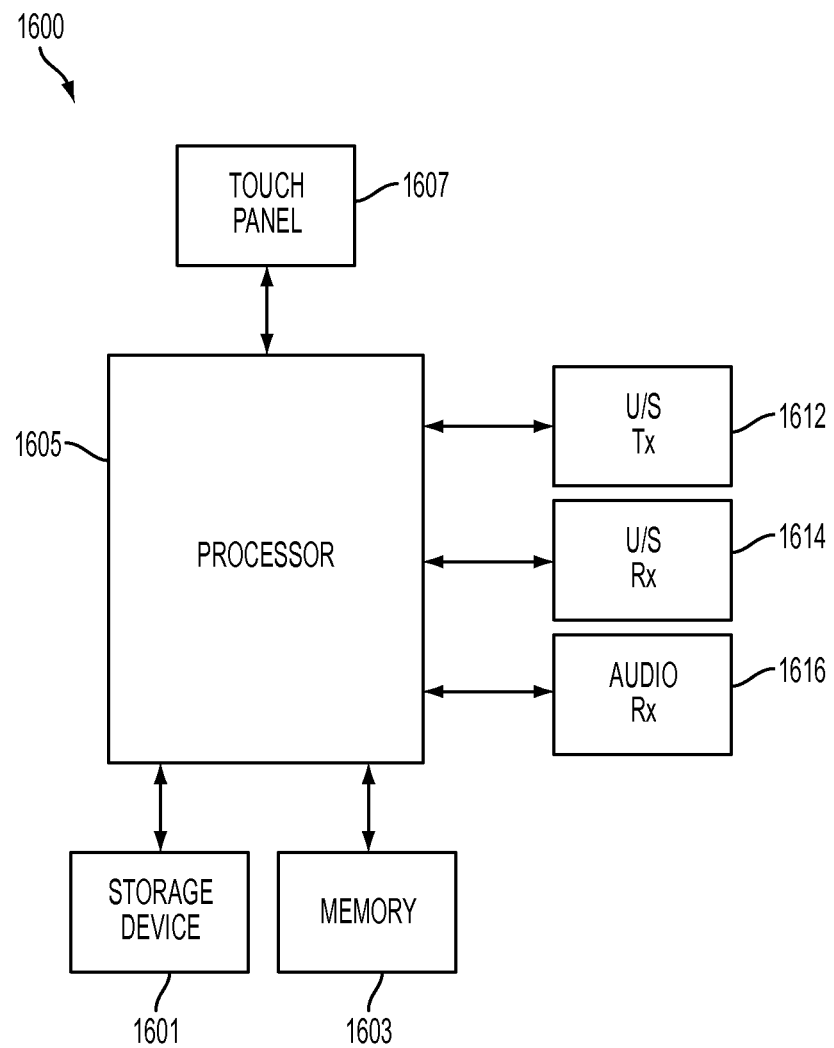
FIG. 16 illustrates a computing system having ultrasound ranging according to various examples of the disclosure.

Ultrasound ranging can operate in a system similar or identical to system 1600 shown in FIG. 16. System 1600 can include instructions stored in a non-transitory computer readable storage medium, such as memory 1603 or storage device 1601, and executed by processor 1605. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 1600 can further include ultrasound transmitter 1612, ultrasound receiver 1614, and audio receiver 1616 coupled to the processor 1605. The transmitter 1612 and receivers 1614, 1616 can be any of those described in FIGS. 1 through 15. The processor 1605 can process inputs to the transmitter 1612 and outputs from the receivers 1614, 1616 to perform actions based on ranges and other data associated with proximate devices.

The system 1600 can include touch panel 1607 coupled to the processor 1605. Touch panel 1607 can have touch nodes capable of detecting an object touching or hovering over the panel. The processor 1605 can process the outputs from the touch panel 1607 to perform actions based on the touch or hover event.

It is to be understood that the system is not limited to the components and configuration of FIG. 16, but can include other or additional components in multiple configurations according to various examples. Additionally, the components of system 1600 can be included within a single device, or can be distributed between multiple devices. In some examples, the processor 1605 can be located within the touch panel 1607 and/or the imaging range finder 1609.

Described above are a number of instances wherein devices communicate using RF signals. It should be understood that the communications described in this document that include the use of RF signals may be performed using technologies such as but not limited to: WiFi (IEEE 802.11a/b/g/n/ac) technology; Bluetooth (including but not limited to Bluetooth Low Energy (BTLE)) technology; Apple Wireless Direct Link (AWDL) technology; IEEE 802.15.4 or Zigbee technology; cellular technology; and/or any other appropriate technology.

Therefore, according to the above, some examples of the disclosure are directed to a mobile device comprising: a multifunctional component capable of performing multiple functions in the device, the component functioning as a ultrasound transmitter capable of emitting a first signal to another device; and an ultrasound receiver capable of receiving a second signal from the other device, wherein the mobile device is capable of determining a range of the other device based on a time lapse associated with the second signal. Additionally or alternatively to one or more of the examples disclosed above, the component also functions as a power button capable of powering the device up or down. Additionally or alternatively to one or more of the examples disclosed above, the component also functions as a home button capable of causing a home page to display on the device. Additionally or alternatively to one or more of the examples disclosed above, the device further comprises: an audio receiver capable of detecting a third signal from an external audio source. Additionally or alternatively to one or more of the examples disclosed above, the device further comprises: a processor capable of finding the range based on a time lapse between time of transmission of the first signal and time of receipt of the second signal. Additionally or alternatively to one or more of the examples disclosed above, the ultrasound receiver is combined with an audio receiver, the combined receiver capable of receiving the second signal from the other device and an audio signal from an external source. Additionally or alternatively to one or more of the examples disclosed above, the component is disposed on an exterior surface of the device. Additionally or alternatively to one or more of the examples disclosed above, the device comprises at least one of a mobile phone, a digital media player, or a personal computer.

Some examples of the disclosure are directed to a mobile device comprising: a housing; at least one aperture in the housing capable of passing sound waves therethrough; and at least one ultrasound receiver disposed within the housing and capable of detecting an ultrasound signal received through the aperture. Additionally or alternatively to one or more of the examples disclosed above, the housing has at least two apertures and houses at least two ultrasound receivers, each aperture being proximate to a corresponding receiver to pass the sound waves to the corresponding receiver for detection. Additionally or alternatively to one or more of the examples disclosed above, the housing has one aperture and houses at least two ultrasound receivers, the receivers sharing the one aperture. Additionally or alternatively to one or more of the examples disclosed above, the device further comprises: an audio receiver disposed within the housing and capable of detecting an audio signal, wherein the housing has at least two apertures, one of the apertures being proximate to the audio receiver and another of the apertures being proximate to the ultrasound receiver. Additionally or alternatively to one or more of the examples disclosed above, the device further comprises: an audio receiver disposed within the housing and capable of detecting an audio signal, wherein the housing has one aperture, the audio receiver and the ultrasound receiver sharing the one aperture. Additionally or alternatively to one or more of the examples disclosed above, the device further comprises: at least one ultrasound transmitter disposed within the housing and capable of transmitting an ultrasound signal. Additionally or alternatively to one or more of the examples disclosed above, the ultrasound transmitter includes multiple die, each die providing a transmitter component for generating the ultrasound signal within a different frequency band.

Some examples of the disclosure are directed to a mobile device comprising: a housing; at least one aperture in the housing capable of passing sound waves therethrough; and at least one ultrasound transmitter disposed within the housing and capable of transmitting an ultrasound signal through the aperture. Additionally or alternatively to one or more of the examples disclosed above, the device further comprises: at least one ultrasound receiver disposed within the housing and capable of detecting an ultrasound signal. Additionally or alternatively to one or more of the examples disclosed above, the device further comprises: an audio receiver disposed within the housing and capable of detecting an audio signal.

Some examples of the disclosure are directed to a ranging system comprising: a first device; and a second device proximate to the first device, wherein the first device includes at least one ultrasound transmitter capable of transmitting a first signal toward the second device and at least one ultrasound receiver capable of receiving a second signal from the second device, the first device capable of determining a range of the second device based on at least the second signal, and wherein the second device includes at least one ultrasound transmitter capable of transmitting the second signal to the first device in response to the first signal from the first device. Additionally or alternatively to one or more of the examples disclosed above, the first device includes at least two ultrasound transmitters, a first of the transmitters being disposed at a first side of the first device and a second of the transmitters being disposed at a second side of the first device. Additionally or alternatively to one or more of the examples disclosed above, the first device includes at least two ultrasound receivers, the receivers being disposed around the sides of the first device. Additionally or alternatively to one or more of the examples disclosed above, the first device includes at least one of a unidirectional, directed, or omnidirectional ultrasound transmitter and at least one of a unidirectional, directed, or omnidirectional ultrasound receiver.

Some examples of the disclosure are directed to a method of finding a range of a proximate device, comprising: transmitting a first ultrasound signal; recording a time of transmission of the first signal; receiving a second ultrasound signal from a proximate device; recording a time of receipt of the second signal; and calculating a range between the mobile device and the proximate device based on a time lapse between the recorded time of transmission of the first signal and the recorded time of receipt of the second signal.

Some examples of the disclosure are directed to a mobile device comprising: a housing; and at least one ultrasound component disposed on an external surface of the housing and capable of at least one of transmitting or receiving an ultrasound signal. Additionally or alternatively to one or more of the examples disclosed above, the component is a transmitter capable of transmitting an ultrasound signal, a receiver capable of receiving the ultrasound signal, or a transceiver capable of both receiving a first ultrasound signal and transmitting a second ultrasound signal.

Although examples have been fully described with reference to the accompanying drawings, it is to be noted that various changes and modifications will become apparent to those skilled in the art. For example, other steps may be provided, or steps may be eliminated, from the described flows, and other components may be added to, or removed from, the described devices. Such changes and modifications are to be understood as being included within the scope of the various examples as defined in this Detailed Description and by the appended claims.

What is claimed is:

1. A mobile device comprising:
   an ultrasound transmitter disposed on an exterior surface of the mobile device, the ultrasound transmitter configured to receive a touch input and to emit a first signal to a proximate device when instructed by a processor;
   an ultrasound receiver configured to receive a separate second signal from the proximate device; and
   the processor configured to:
      determine a range of the proximate device based on a time lapse associated with the second signal; and
      perform an action that changes a display of the mobile device when the ultrasound transmitter receives the touch input.

2. The mobile device of claim 1, wherein the action comprises powering up or down the display when the ultrasound transmitter receives the touch input.

3. The mobile device of claim 1, wherein the action comprises causing a home page to be displayed on the display of the mobile device when the ultrasound transmitter receives the touch input.

4. The mobile device of claim 1, wherein the first signal is transmitted as a tone burst signal.

5. The mobile device of claim 1, wherein the processor is further configured to:
   determine the range of the proximate device based on the time lapse between a time of transmission of the first signal and a time of receipt of the second signal.

6. The mobile device of claim 1, wherein the first signal is transmitted as a chirp signal.

7. The mobile device of claim 1, wherein the ultrasound transmitter is configured to transmit the first signal without an aperture to pass the first signal.

8. The mobile device of claim 1, wherein the first signal is transmitted as a CDMA signal.

9. The mobile device of claim 1, wherein the ultrasound transmitter is pressable.

10. The mobile device of claim 9, wherein the ultrasound transmitter is configured to emit the first signal when the ultrasound transmitter is pressed.

11. A ranging system comprising:
   a first device including at least a first ultrasound transmitter and one or more ultrasound receivers; and
   a second device proximate to the first device, the second device including at least a second ultrasound transmitter,
   wherein the first ultrasound transmitter is configured to transmit a first signal toward the second device;
   wherein the second ultrasound transmitter is configured to transmit a separate second signal to the first device in response to the first signal from the first device;
   wherein the one or more ultrasound receivers are configured to receive the separate second signal from the second device; and
   wherein the first device is configured to determine a range of the second device based on at least the second signal.

12. The system of claim 11, wherein the first device includes at least a third ultrasound transmitter, wherein the first ultrasound transmitter is disposed at a first side of the first device and the third ultrasound transmitter is disposed at a second side of the first device, the second side different than the first side.

13. The system of claim 12, wherein the first ultrasound transmitter is configured to transmit the first signal when the first device is held in a portrait orientation and the third ultrasound transmitter is configured to transmit a third signal when the first device is held in a landscape orientation.

14. The system of claim 11, wherein the first device includes at least two ultrasound receivers, the at least two ultrasound receivers being disposed along at least two different sides of the first device.

15. The system of claim 11, wherein the first device includes at least one of a unidirectional, directed, or omni-directional ultrasound transmitter and at least one of a unidirectional, directed, or omnidirectional ultrasound receiver.

16. The system of claim 15, wherein the one or more ultrasound receivers are disposed on a back side of the first device and a front side of the first device includes a touch screen.

17. The system of claim 11, wherein the first ultrasound transmitter is actuated by pressing the first ultrasound transmitter.

18. A method of finding a range of a proximate device, comprising:
   transmitting a first ultrasound signal from a mobile device ultrasound transmitter;
   recording a time of transmission of the first signal;
   receiving a separate second ultrasound signal from a proximate device at a plurality of ultrasound receivers of the mobile device, the separate second ultrasound signal being received subsequent to transmitting the first signal;
   recording times of receipt of the second signal at the plurality of ultrasound receivers; and
   calculating a range between the mobile device and the proximate device and a relative orientation based on time lapses between the recorded time of transmission of the first signal and the recorded times of receipt of the second signal.

19. A mobile device comprising:
   a housing; and
   at least one ultrasound transmitter disposed on an external surface of the housing, the at least one ultrasound transmitter being touch actuated and configured to transmit, when touch actuated, an ultrasound signal without an aperture to pass the ultrasound signal.

20. The mobile device of claim 19, wherein the at least one ultrasound transmitter is further configured to receive a second ultrasound signal without the aperture to pass the second ultrasound signal.

* * * * *